(12) United States Patent
Holt et al.

(10) Patent No.: US 6,909,776 B2
(45) Date of Patent: Jun. 21, 2005

(54) SYSTEMS AND METHODS FOR MONITORING NETWORK-BASED VOICE MESSAGING SYSTEMS

(75) Inventors: Scott C. Holt, Decatur, GA (US); Robert A. Koch, Norcross, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 134 days.

(21) Appl. No.: 10/021,049

(22) Filed: Dec. 19, 2001

(65) Prior Publication Data

US 2003/0118160 A1 Jun. 26, 2003

(51) Int. Cl.[7] ............................................... H04M 1/64
(52) U.S. Cl. ............................... 379/88.26; 379/88.17; 379/211.02; 455/416
(58) Field of Search ........................... 379/67.1, 88.01, 379/88.11, 382, 88.17, 88.18, 88.25, 211.01, 211.02, 88.12

(56) References Cited

U.S. PATENT DOCUMENTS

| | | | | |
|---|---|---|---|---|
| 5,651,054 | A | * | 7/1997 | Dunn et al. ............... 379/88.11 |
| 6,031,896 | A | * | 2/2000 | Gardell et al. ............ 379/88.17 |
| 6,282,269 | B1 | | 8/2001 | Bowater et al. |
| 6,295,341 | B1 | | 9/2001 | Muller |
| 6,310,939 | B1 | * | 10/2001 | Varney .................... 379/88.01 |
| 6,337,898 | B1 | * | 1/2002 | Gordon ...................... 379/67.1 |
| 6,418,306 | B1 | | 7/2002 | McConnell |
| 6,477,246 | B1 | | 11/2002 | Dolan et al. |
| 6,498,841 | B2 | | 12/2002 | Bull et al. |

OTHER PUBLICATIONS

Girard, Apparatus And Method For Telephony Service Interface To Software Switch Controller, Nov. 1, 2001.*

* cited by examiner

*Primary Examiner*—Fan Tsang
*Assistant Examiner*—Gerald Gauthier
(74) *Attorney, Agent, or Firm*—Myers Bigel Sibley & Sajovec, P.A.

(57) ABSTRACT

Systems and methods for monitoring a call directed to a telephony network-based voice messaging service (VMS) implemented using packet-switched data network telephone conferencing resources, such as an IP-based voice-over-IP conferencing system. The systems and methods use one or more media gateway systems providing an interface between a conventional telephony domain and packet-switched data domain. When a call is to be redirected to the VMS system, the telephony network routes the call via the packet-switched data network using the media gateway. An application server in the packet-switched data network maintains registration information associated with the subscriber. If the subscriber is logged onto the packet-switched data network, the conferencing resources are used to establish a conference call between the caller, the VMS and the subscriber.

63 Claims, 8 Drawing Sheets

SYSTEMS AND METHODS FOR MONITORING NETWORK-BASED VOICE MESSAGING SYSTEMS

BACKGROUND

1. Field of the Invention

The present invention relates generally to telecommunications systems, and more particularly, the present invention relates to enhanced network-based voice messaging services.

2. Background of the Invention

Telephone systems have become a central means for communicating with others on a real-time basis. However, for a variety of reasons, it is generally not possible or convenient for subscribers to answer every telephone call received. For example, with the high volume of junk calls (e.g., telemarketing, wrong numbers, and the like) many subscribers choose not to answer an incoming call. Subscribers may screen their calls using an answering machine that allows them to monitor the message as the caller records it. If the subscriber then recognizes the caller as someone he wants to speak to, he can override the answering machine and take the call. Answering machines have also been beneficial in those circumstances where the subscriber is not available to receive a call. In that case, the caller can still leave a message for the subscriber.

However, answering machines are vulnerable to malfunction due to loss of power, depleted recording media, and the like. Furthermore, if the subscriber's line is busy, the caller cannot get through to leave a message on an answering machine. To solve these problems, telecommunications service providers have developed network-based voice messaging systems (VMS). Such systems are generally maintained in controlled environments with adequate backup power supplies and redundant systems for high reliability. Furthermore, VMS systems may be configured to receive inbound calls when the subscriber's line is not available. Accordingly, conventional VMS systems have greatly improved the capabilities for subscribers to ensure callers can leave a message when the subscriber does not answer a call. A problem remains, however, for those subscribers who desire the capability to monitor messages as they are being recorded and the capability to intervene in the call to speak to the caller.

Figure 1:
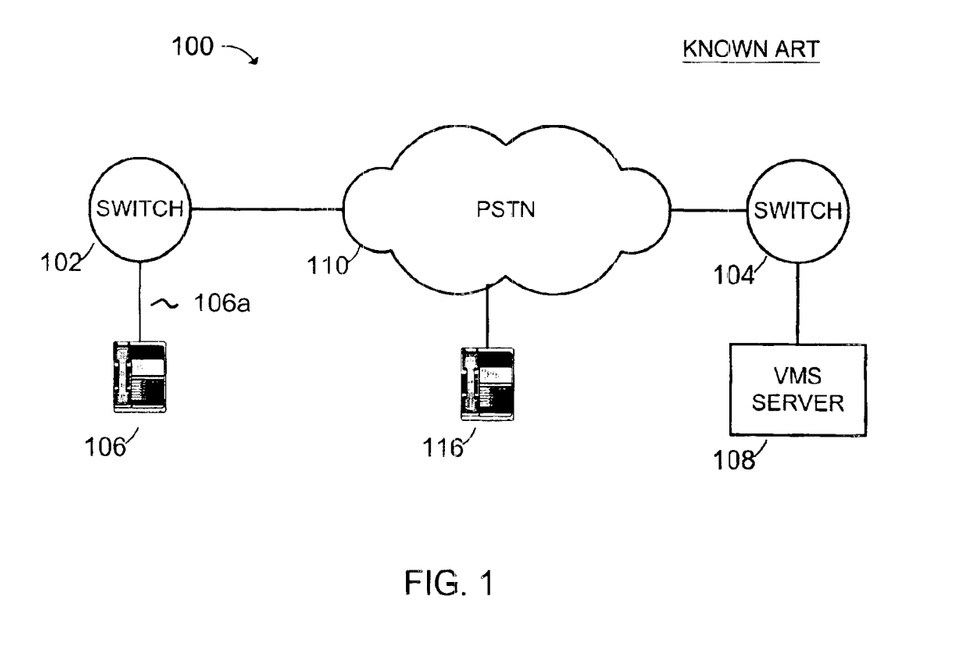
FIG. 1 is a schematic diagram showing a conventional implementation of a network-based voice messaging system.

FIG. 1 shows how conventional voice messaging services operate. PSTN domain 100 includes telephony systems such as switches 102 and 104. Switch 102 serves the subscriber's telephone 106 and switch 104 serves voice messaging system (VMS) server 108. Switches 102 and 104, for example, may be the same switch or may be different switches as shown in FIG. 1. Switches 102 and 104 may be a circuit-switched service switching points (SSPs) such as the switches used in advanced intelligent networks (AIN) or may be a packet-switched network element. PSTN domain 100 also comprises PSTN 110 which may include for example, local exchange carriers, competitive local exchange carriers, long distance carriers, and the like. PSTN 110 may provide a network link between switches 102 and 104, as shown in FIG. 1.

When a caller, using, for example, telephone 116 calls the subscriber at telephone 106, the call will be processed by the subscriber's host switch 102 in the normal manner. If subscriber line 106a is busy or the call is not answered, the call is forwarded from switch 102 to VMS server 108 via PSTN 110 and switch 104. VMS server 108 may provide a message to the caller prompting him to record a message. VMS server 108 may also provide a variety of other options to the caller (e.g., message priority, replay recorded message, and the like).

SUMMARY OF THE INVENTION

The present invention provides systems and methods for monitoring a call directed to a network-based voice messaging service (VMS) via packet-based network conferencing resources, such as, for example an IP-based voice-over-IP telephony system. The system and method use one or more media gateway systems providing an interface between a conventional telephony domain and the Packet-switched data network domain. When a call is to be redirected to the VMS system, it is routed via the Packet-switched data network domain using the media gateway. An application server in the Packet-switched data network domain maintains registration information associated with the subscriber. If the subscriber is logged onto the Packet-switched data network domain, the conferencing resources are used to establish a conference call between the caller, the VMS and the subscriber.

In embodiments of the present invention, the subscriber may actively participate in the conference call. That is, as with conventional answering machines, the subscriber may listen to the caller leaving a message with the voice messaging service and decide to answer the call. In this case, the voice messaging service may be dropped from the conference call.

DETAILED DESCRIPTION OF THE INVENTION

The present invention provides systems and methods for allowing a subscriber of a network-based voice messaging service to remotely monitor callers as they record messages to the subscriber's voice messaging service. The invention further provides systems and methods for allowing the subscriber to interrupt callers as they are recording a message, so that the subscriber may intercept the telephone call and speak to the caller.

Architecture Used in an Exemplary Embodiment

Figure 2:
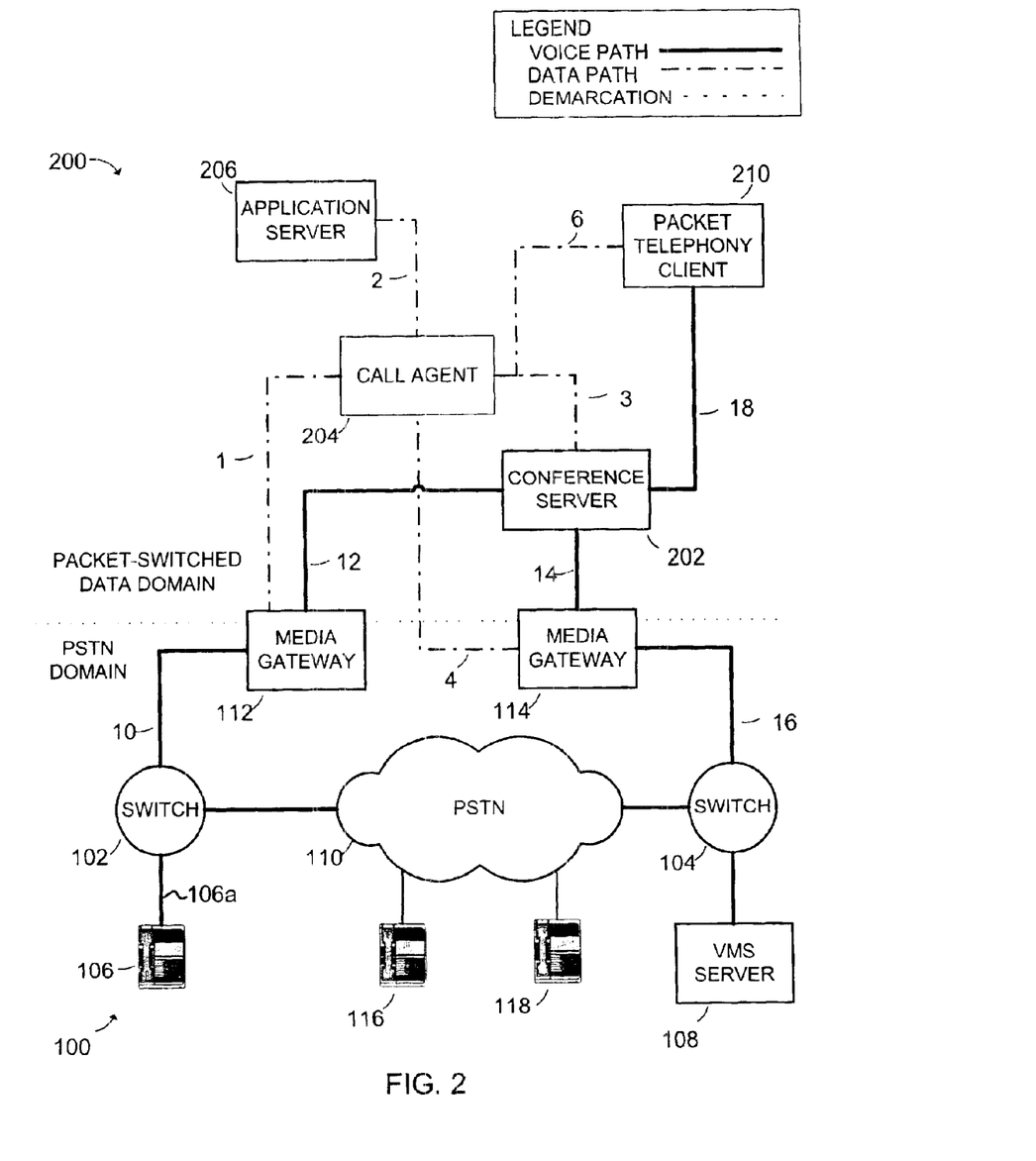
FIG. 2 is a schematic diagram showing an implementation of an embodiment of the present invention.

In an exemplary embodiment, a telephony network is integrated with a data network to provide an affordable system for carrying out the present invention. FIG. 2 shows an architecture that may be used to implement an embodiment of the present invention. For clarity in this description, FIG. 2 shows two basic domains: Public switched telephone network (PSTN) domain 100 and packet-switched data network domain 200. However, the line of demarcation between the domains is arbitrary. PSTN domain 100 includes the same elements as described above in relation to FIG. 1. As noted above, packet-switched data network domain 200 may be any suitable data network, including, for example, an Internet Protocol (IP) network.

Figure 3A:
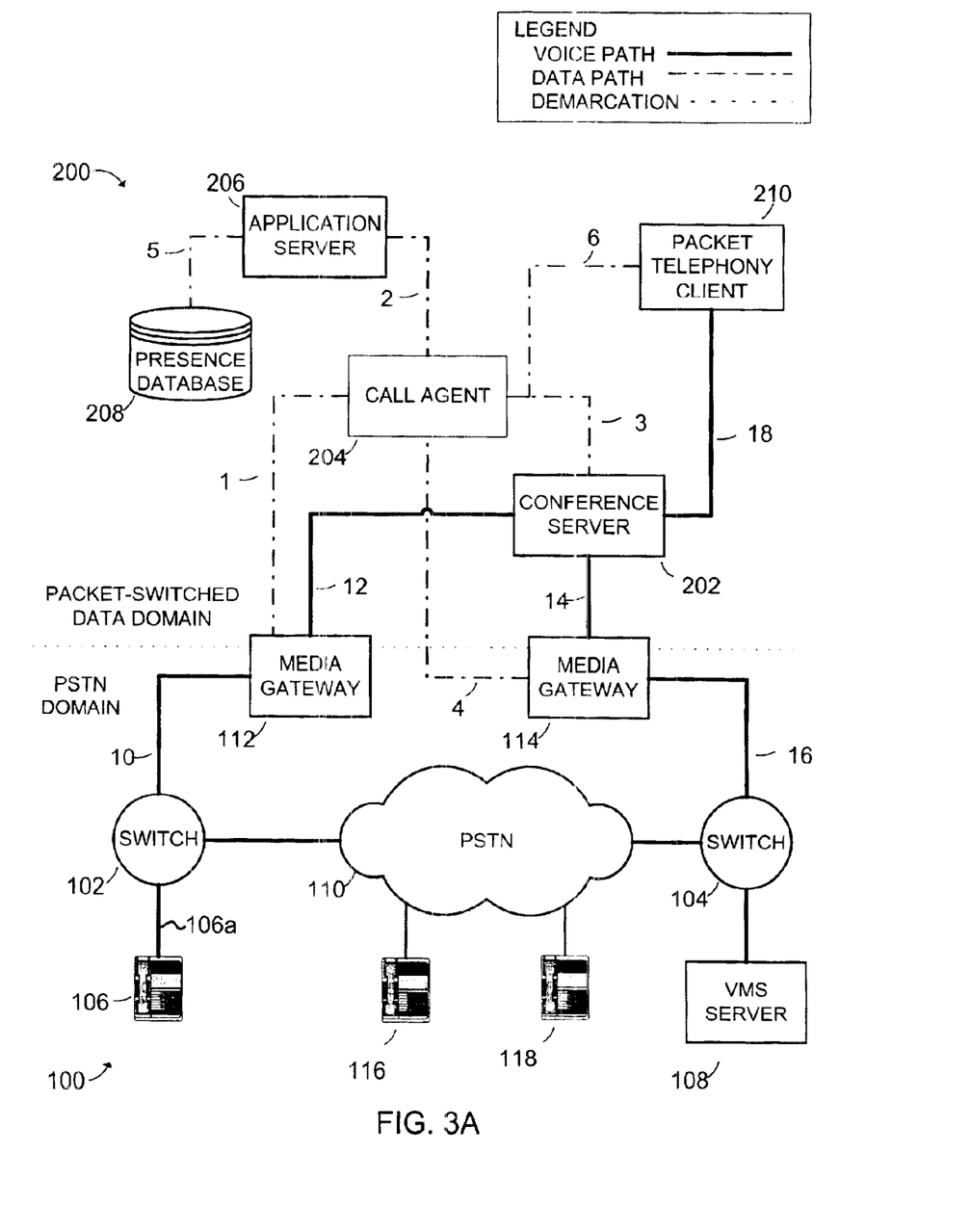
FIG. 3A is a schematic diagram showing an embodiment of the present invention including a presence database.

Media gateways 112 and 114 may provide an interface between PSTN domain 100 and packet-switched data network domain 200. Packet-switched data network domain 200 may comprise conference server 202, call agent 204, application server 206, presence database 208 (see FIG. 3) and packet telephony client 210. In an embodiment of the present invention, media gateways 112 and 114 may be the same gateway, that is a single system may be used to provide an inbound and outbound interface between telephony domain 100 and Packet-switched data network domain 200. Packet telephony client 210 may be collocated with telephone 106 (i.e., the subscriber may implement a monitoring system to screen calls forwarded to voice mail using a computer system in proximity to his subscriber telephone). Alternatively, packet telephony client may be at a remote location allowing the subscriber to monitor calls from other locations. The functions and operations of these systems (i.e., gateways, servers, packet telephony client, and the like) are described in more detail below.

Operation in an Exemplary Embodiment

When a caller, using, for example, telephone 116 calls a subscriber at telephone 106, the call may be processed by the subscriber's switch 102 in the normal manner. That is, the switch may attempt to terminate (i.e., connect) the call to the subscriber's line 106a. If subscriber line 106a is busy or the call is not answered, the call may be forwarded from switch 102 to inbound media gateway 112 via communications link 10. As shown in FIG. 2, communications link 10 may provide a voice path from switch 102 to media gateway 112. Communications link 10 may also transport information about the call, such as, for example, the calling party number (CgPN) and the called party number (CdPN) (i.e., the directory number associated with subscriber line 106a). Upon receiving the call, media gateway 112 may notify, via communications link 1, call agent 204 that an inbound call has been received. As shown in FIG. 2, communications link 1 may provide a data path from media gateway 112 to call agent 204. The notification message may include information that may be used to identify the subscriber, such as, for example, the CdPN.

Call agent 204 may be any system adapted to provide call control functions in a voice-over-data network. An example of a suitable call agent may be a soft-switch system, such as, for example, the Alcatel 1000 Multimedia Multiservice Exchange (available from Alcatel, Paris, France) and switches provided by other vendors including, for example, Lucent Technologies (Murray Hill, N.J.), Sonus Networks (Westford, Mass.), and the like. Call agent functions may also be provided via a media gateway controller, such as for example, the Cisco Media Gateway Controller (available from Cisco Systems, San Jose, Calif.), and the like. When call agent 204 receives the inbound call notification, it may notify application server 206 via communications link 2, which provides a data path between the systems. Application server 206 may be any suitable computer system that has a central processor, a memory and application processing logic. Application server 206 provides the processing logic for implementing an embodiment of the present invention.

Application server 206 may include one or more databases used to store configuration information related to the service. For example, a database may be used to store one or more network addresses (e.g., an IP address, if the underlying data network is an IP network) associated with the subscriber's packet telephony client 210. Such databases may be internal to application server 206 or may be some other database system (not shown in the Figures). Packet telephony client 210 is a network system associated with the subscriber of the service. Packet telephony client 210 may be any suitable voice-over-data system, such as for example, voice-over-IP systems. In an embodiment of the present invention, packet telephony client 210 may comprise a software application running on a computer system. In another embodiment, packet telephony client 210 may comprise a network appliance adapted to provide voice-over-data network service. Voice-over-data systems may be based on the well-known H.323 communications protocol, session initiation protocol (SIP), or some other suitable packet telephony protocols. The network address for packet telephony client may be a pre-defined network address. That is, in some embodiments, a subscriber may be known to use the same packet telephony client system to monitor incoming calls according to the present invention. In other embodiments, a subscriber may use multiple packet telephony clients or may not have a statically-assigned network address. In this case, the subscriber may log-in or register each time he begins a session to inform the network of his address. Such notification may be manually performed by the subscriber or may be an automatic process initiated, for example, whenever the user logs into his computer system.

In one embodiment of the present invention, which may be implemented using an architecture show in FIG. 2A, application server 206 instructs call agent 204 to initiate call legs between the caller, the VMS system, and the packet telephony client 210 through conference server 202 even if the subscriber is not available at packet telephony client 210. In this embodiment, application server 206 may first instruct call agent 204 to set up call legs (i.e., voice paths) 12, 14, and 16 from inbound media gateway 112 to conference server 202, from conference server 202 to media gateway 114, and from outbound media gateway 114 to VMS server 108 (via switch 104), respectively. Call agent 204 may send appropriate instructions to inbound media gateway 112, conference server 202 and outbound media gateway 114 via communications links 1, 3 and 4, respectively. Accordingly, in this embodiment, application server 206 does not cheek to determine whether or not the subscriber has actually logged into the network and conference resources are allocated to provide a voice path between the caller and VMS server 108.

In this embodiment, application server 206 may then look up a network address associated with packet telephony client 210. The look up may include, for example, searching for the CdPN (i.e., the subscriber's DN) in a database to locate the associated network address. Once the network address has been determined, application server 206 may instruct call agent 204 to set up a call leg from conference server 202 to packet telephony client 210.

Application server 206 may instruct call agent 204 to send an invitation to the subscriber to join the conference call. In response to the instruction, call agent 204 may send a message to packet telephony client 210 via communications link 6. The message may inform the subscriber that a caller is recording a message to his voice messaging system and may provide an opportunity for the subscriber to monitor the call. If the subscriber accepts the invitation, a voice path may be established, via communications link 18, between packet telephony client 210 and conference server 202. Once all of the voice paths have been established, a three-way conference call is in progress between the caller at telephone 116, VMS server 108 and the subscriber at packet telephony client 210. If the subscriber declines the invitation, or there is no response from packet telephony client 210, the call between the caller and VMS server 108 continues unimpeded, but still utilizes resources on conference server 202.

Operation Using a Presence Database

In other embodiments of the present invention, application server 206 may first query whether or not the subscriber is available to monitor his calls. The architecture shown in FIG. 3A may be used to implement such embodiments. FIG. 3A includes all of the components described in FIG. 2 and additionally includes presence database 208. Application server 206 may query a database or other information file to make this determination. The database may be internal to application server 206 or may be an external database such as presence database 208, in communication with application server 206 via communications link 5. In this embodiment, application server 206 instructs call agent 204 to allocate conference resources only if the subscriber is available (i.e., the subscriber has registered or logged onto the data network and indicated that he wants to monitor messages as they are recorded to voice messaging system server 108).

Figure 3B:
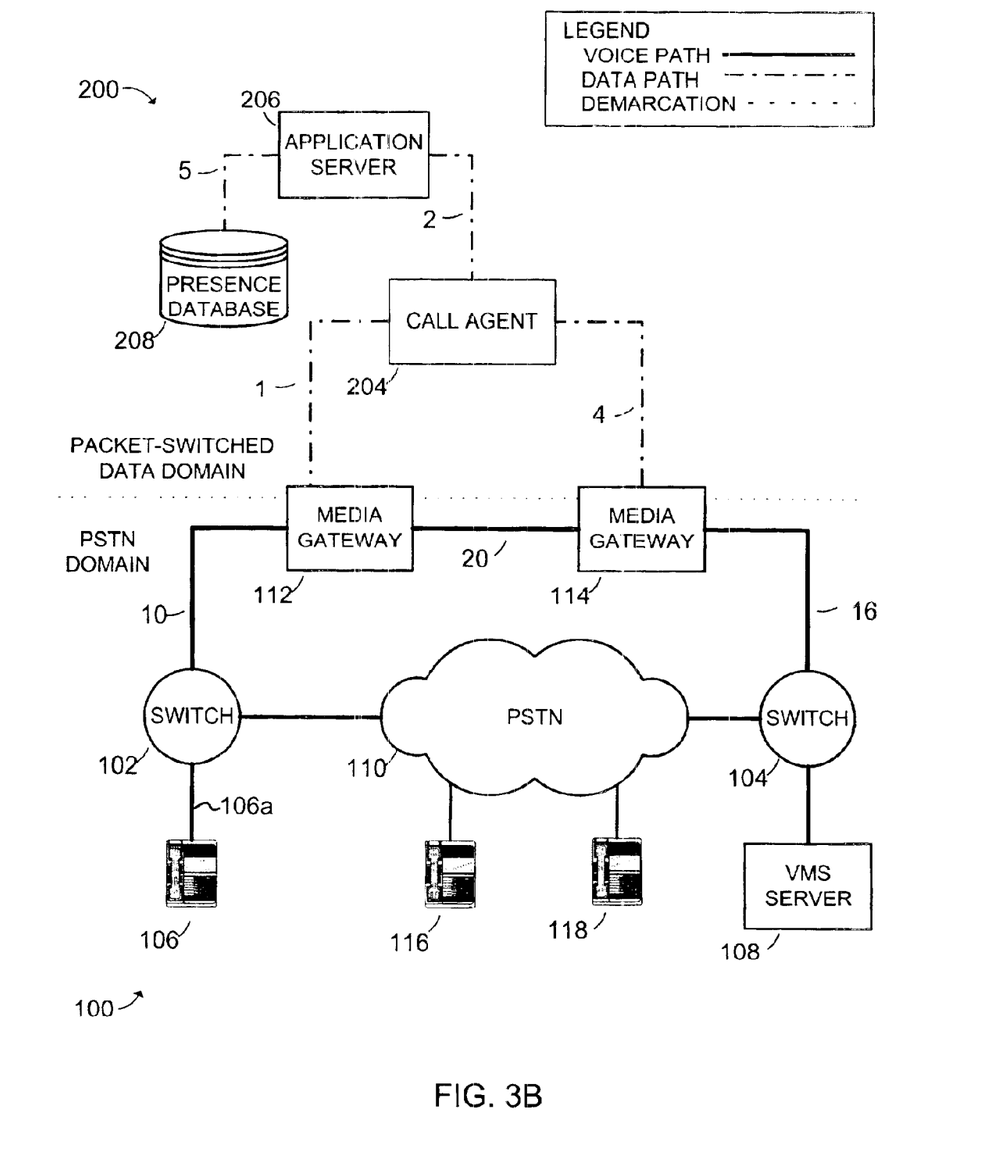
FIG. 3B is a schematic diagram showing the voice path that may be used in an embodiment of the present invention when a subscriber is not available to monitor the call.

If the subscriber is not available, then application server 206 instructs call agent 204 to set up call legs directly between inbound media gateway 112 to outbound media gateway 114. FIG. 3B shows how a resulting voice path may be established between the caller and VMS server 108, through media gateway 112, communications link 20, media gateway 114 and communications link 16. As shown in FIG. 3B, the voice path in this situation need not connect through a conference server, thereby preserving conference resources for other uses.

Operation from a Subscriber's Perspective

Once the voice paths have been established between the caller at telephone 116, VMS server 108 and packet telephony client 210, the subscriber (if he is using packet telephony client 210) may passively monitor the conversation between the caller and the VMS system. That is, the subscriber may monitor the caller's message as it is being recorded to VMS server 108 without interrupting the caller. In some embodiments of the present invention, the subscriber's leg of the call may be controlled by software on packet telephony client 210. That is, packet telephony client 210 may include logic for ensuring that the subscriber's monitoring of the call is a one-way communication. One reason such control may be desirable is to prevent the caller from knowing that the call is being screened. A one-way communication may also be established by, for example, muting the microphone on packet telephony client 210. In other embodiments of the present invention, conference server 202 may be adapted to ensure a one-way communication to the subscriber.

In other embodiments of the invention, if the subscriber has multimedia capabilities (e.g., a microphone and speakers) on packet telephony client 210 he may be provided the capability to accept the call and become a full participant in the call. For example, in one embodiment of the present invention, the subscriber may select an option provided by programming logic on packet telephony client 210 to join the call. In this embodiment, packet telephony client 210 may send a message to call agent 204 indicating the subscriber's intent to answer the call. Call agent 204 may then instruct conference server 202 to drop VMS server 108 (and media gateway 114) from the call. Packet telephony client 210 (or conference server 202) may then allow a two-way communication between the caller and the subscriber, via conference server 202.

In another embodiment, even if the subscriber does not have multimedia capabilities on packet telephony client 210, he may still be provided the capability to intercept the call via a telephone device, such as telephone 118, telephone 106, or some other telephone (not shown in the Figures). In this embodiment, the subscriber may send a message (via packet telephony client 210) to call agent 204 instructing it establish a call leg to the telephone device. Call agent 204 may instruct conference server 202 accordingly, and the subscriber may then answer the call on the telephone device and speak to the caller. VMS server 108 (and media gateway 114) and packet telephony client 210 may then be dropped from the conference call.

Operation from a Caller's Perspective

The above described steps (i.e., message transactions between the application server, media gateways and other network elements) generally take place very quickly. Accordingly, there need not be any significant delay in connecting the caller to VMS server 108. From the caller's point of view, the call appears to be a conventionally routed call to the subscriber's voice mail. Unless the subscriber is provided capability to "pick up" the call, and actually does so, the caller may not be aware of the additional call processing steps described herein.

Process Flow in One Embodiment

Figure 4:
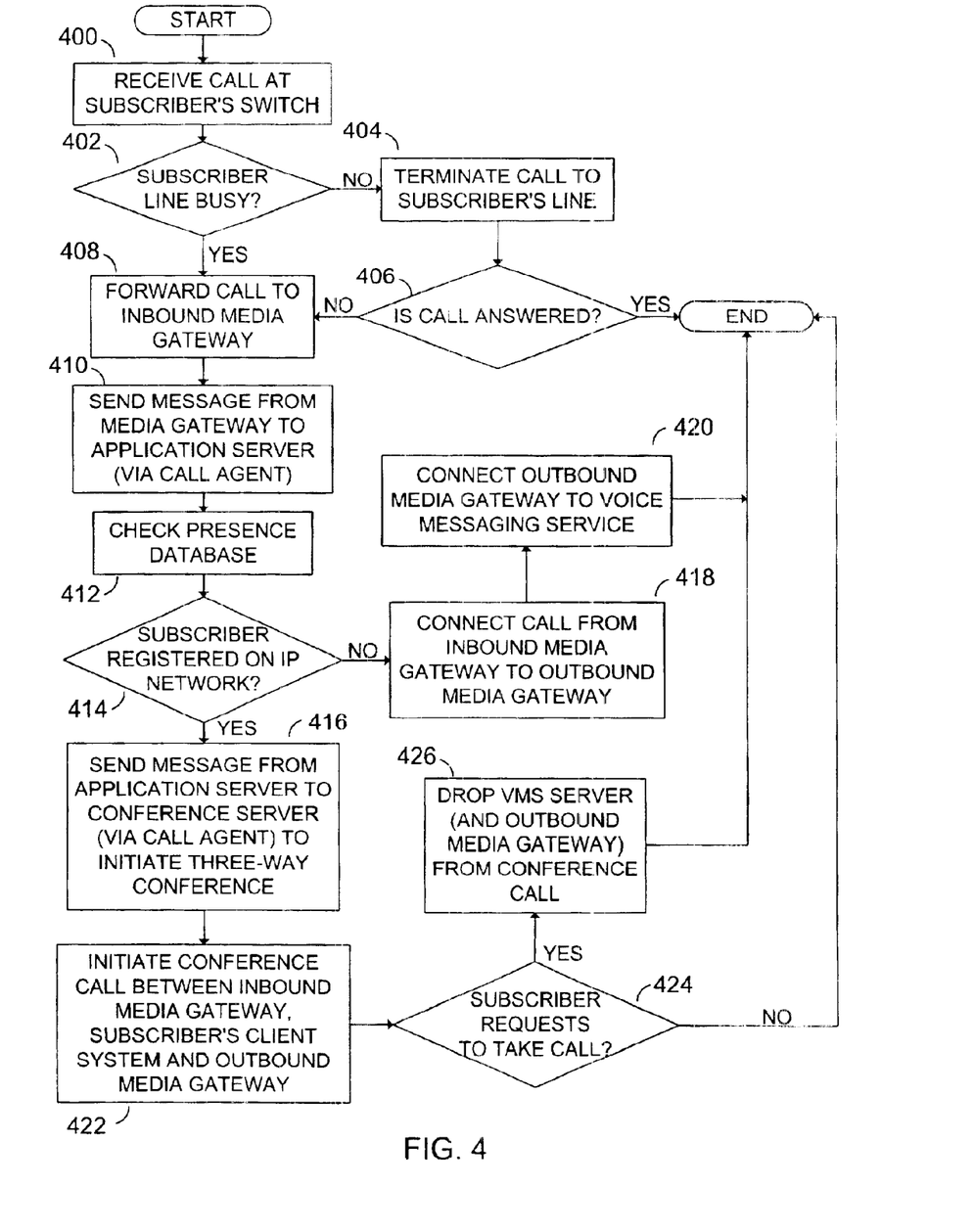
FIG. 4 is a flow diagram showing exemplary steps that may be used to carry out an embodiment of the present invention.

FIG. 4 shows a flow diagram of steps that may be carried out in an embodiment of the present invention. As described above, computer programming logic for performing these steps may be performed by application server 206 or in a system combining functionality of application server 206 and call agent 204. In step 400 a call to a subscriber of a network-based voice messaging server is received at the switch servicing the subscriber's line. In steps 402 and 404, if the subscriber's line is not busy, the switch terminates the call to the subscriber's line in a conventional manner. The subscriber's line then rings or otherwise provides an alert. If, in step 406, the call is answered, no further call processing is required and the process ends. Otherwise, if the call is not answered, the process moves on to step 408 and the call is forwarded to an inbound media gateway. Similarly, if in step 402, the subscriber's line is busy or not available, the process moves on to step 408 as shown in FIG. 4.

After the inbound media gateway receives the call, it sends a message to an application server in step 410 (via a call agent system). The message may include the calling party number or other information identifying the call received on the inbound media gateway. The message may also include the called party number or other information identifying the subscriber. In step 412, the application server may check a presence database to determine whether or not the subscriber is currently registered on the IP network. If, in step 414, the application server determines that the subscriber is registered on the IP network, the application server sends a message to a conference server (via a call agent system) instructing the conference server to initiate a three-way conference call between the inbound media gateway, the subscriber and the voice messaging service in step 416.

Otherwise, the process moves on to step 418 where the call is forwarded from the inbound media gateway to the outbound media gateway. As noted above, in some embodiments, a single media gateway may be used. In this case, step 418 would not be performed and the process would move on directly to step 420. In step 420 the caller is connected to the subscriber's voice messaging service via the media gateway(s). After connecting the caller to the subscriber's voice messaging service, the process ends as shown in FIG. 4.

If the subscriber is registered on the IP network, the process continues in steps 416 and 422, where the conference server sets up the conference call between the caller, the subscriber and the voice messaging service. If an outbound media gateway is used, then the conference call includes the outbound media gateway in the call path to the subscriber. After step 422 has been completed, the subscriber may monitor the communication between the caller and the voice message system. In an embodiment of the present invention, the caller is not provided any cues indicating that the call has been transferred to the voice messaging server via the IP network. Accordingly, in some embodiments, the caller may not be made aware that the subscriber is able to listen in on the communication.

As described above, the subscriber may elect to intervene in the call. If, in step 424, the subscriber makes a request to take the call, the process moves on to step 426. The subscriber may request to receive the call on a conventional telephone device or via the subscriber's client system. If the subscriber the wishes to use a conventional telephone, the subscriber may provide a directory number for the telephone to which the call should be directed. Alternatively, the subscriber may have pre-identified a directory number as part of a registration process. In either case, the conference server (via a call agent system) may be directed to drop the voice messaging server from the conference call as indicated in step 426.

Figure 5:
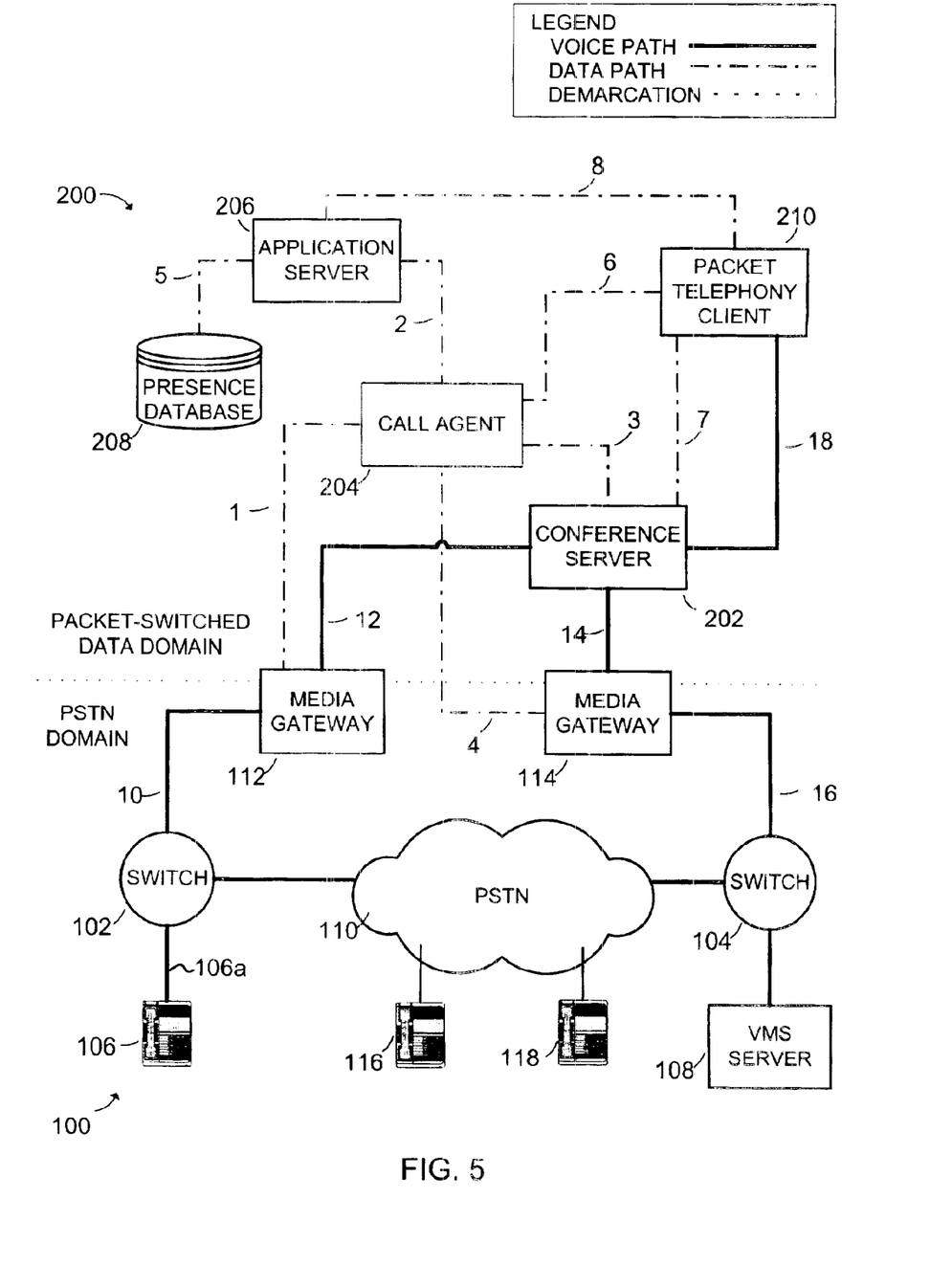
FIG. 5 is a schematic diagram showing additional communications paths that may be used in an embodiment of the present invention.

FIGS. 5–8 show alternative embodiments of the present invention. Each of the embodiments include many of the components described above. FIG. 5 shows an embodiment wherein packet telephony client 210 is in direct communication with the application server 206 and conference server 202 in addition to call agent 204. Such direct communication may be useful, for example, in embodiments wherein applicable programming logic associated with the present invention is operated on each of the systems. That is for example, if conference server 202 is adapted to receive instructions directly from packet telephony client 210, communications link 7 may be used. Similarly, if packet telephony client 210 needs to send registration information to applicable server 206, communications link 8 may be used.

Figure 6:
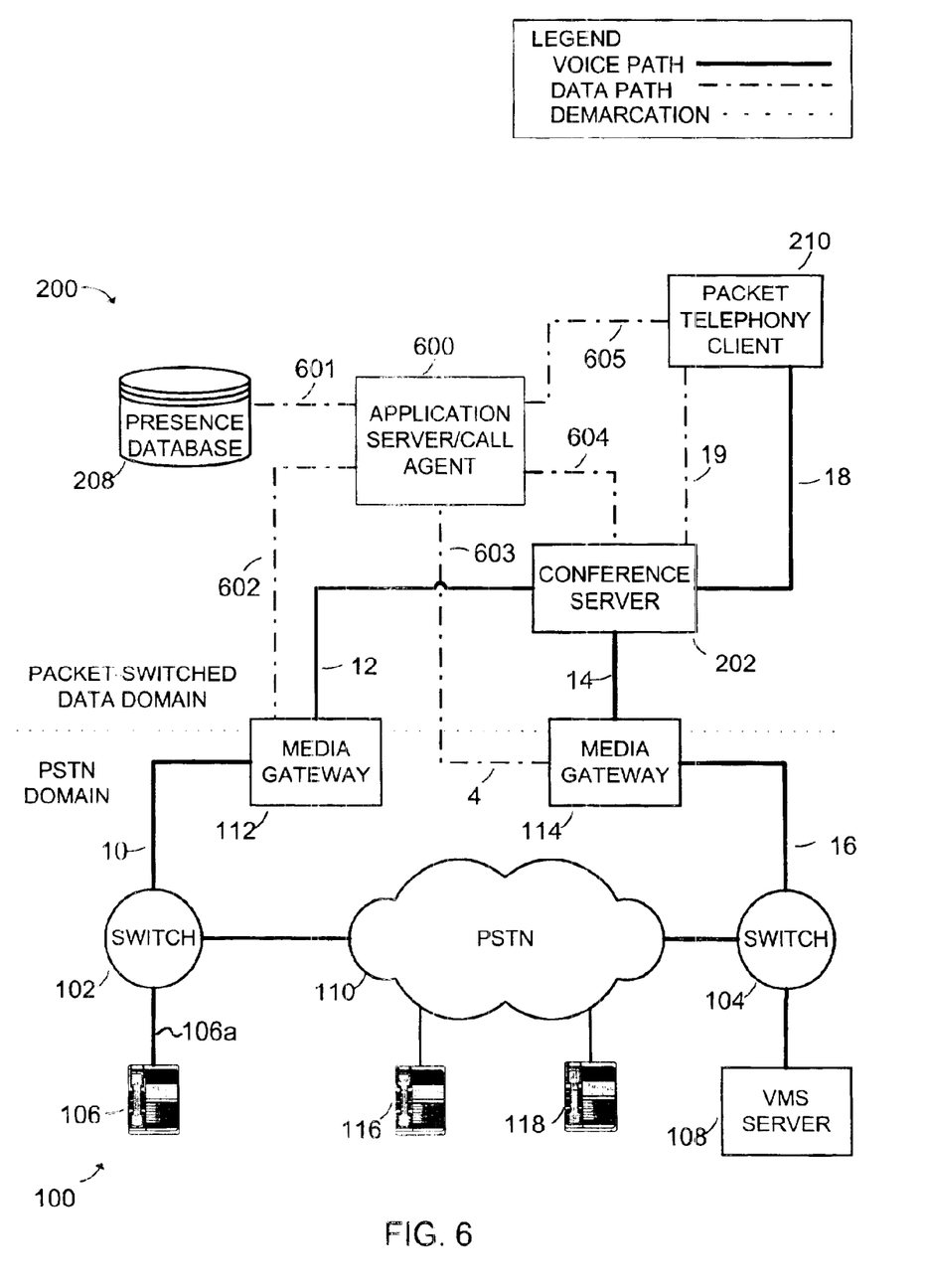
FIG. 6 is a schematic diagram of an architecture that may be used to implement an alternative embodiment of the present invention.

FIG. 6 shows an embodiment wherein the programming logic and functionality of application server 206 and call agent 204 have been combined into a single component. In this embodiment, application server/call agent 600 may include communications links 601–605 as shown in FIG. 6.

Figure 7:
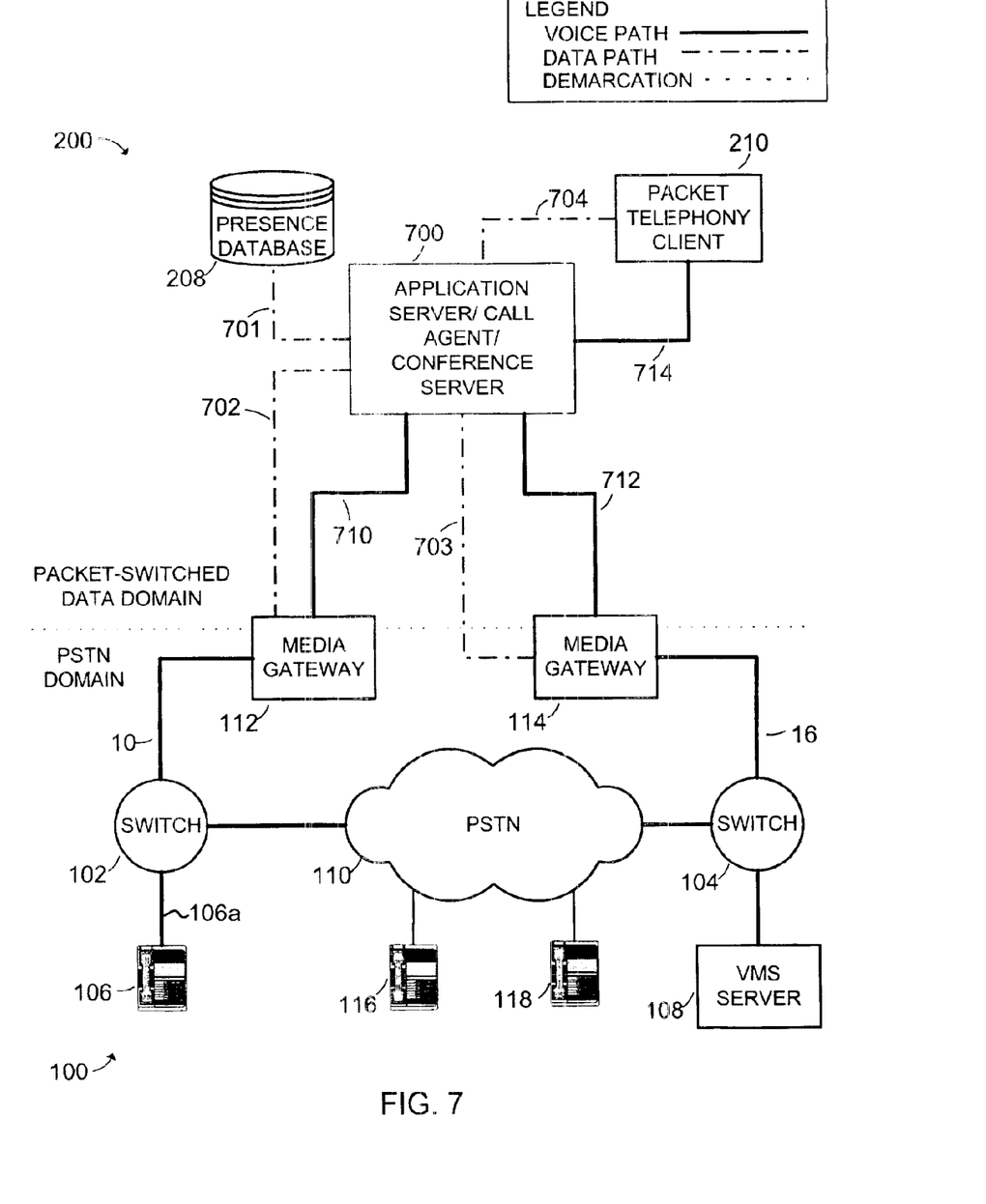
FIG. 7 is a schematic diagram of an architecture that may be used to implement an another alternative embodiment of the present invention.

FIG. 7 shows an embodiment wherein the programming logic and functionality of application server 206, call agent 204 and conference server 202 are combined into a single component. Application server/call agent/conference server 700 includes data paths 701–704 and voice paths 710 and 712 as shown in FIG. 7.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of allowing a subscriber to monitor a caller's recording to a network-based voice messaging service, said method comprising:

detecting a call directed toward a first telephony device associated with the subscriber at a switch serving the subscriber;

routing the call from the switch to a network-based voice messaging server through a conference server, said conference server being in a packet-switched data network; and conferencing a packet-switched telephony client into the call via the conference server, wherein said packet-switched telephony client is associated with the subscriber, and wherein the first telephony device is separate from the packet-switched telephony client.

2. The method of claim 1, further comprising checking a presence database to determine an availability for the subscriber on the packet-switched data network.

3. The method of claim 2, further comprising receiving a registration message from the packet-switched telephony client, wherein said registration message includes the availability for the subscriber.

4. The method of claim 1, further comprising placing a second call from the conference server to a telephony device according an instruction received from the packet-switched telephony client.

5. The method of claim 4, wherein the telephony device is a telephone.

6. The method of claim 4, further comprising removing the network-based voice messaging service from the call on the conference server according to the instruction received from the packet-switched telephony client.

7. The method of claim 1, wherein data packets transmitted from the packet-switched telephony client to the conference server do not include data representing audible speech.

8. The method of claim 1, wherein data packets transmitted from the conference server to the voice messaging server do not include data representing audible speech originating from the packet-switched telephony client.

9. The method of claim 1, further comprising removing the network-based voice messaging service from the call on the conference server according to the instruction received from the packet-switched telephony client.

10. The method of claim 1, wherein the step of routing the call from the switch to the network-based voice messaging service through a conference server comprises:

routing the call from the switch to a media gateway, wherein said media gateway is in the packet-switched data network;

sending a message from the first media gateway to a call agent, Wherein said message includes at least a called party information, and wherein said call agent is in the packet-switched data network;

sending a message from the call agent to an application server, wherein said message includes at least a portion of the called party information, and wherein said application server is in the packet-switched data network;

sending an instruction message from the application server to the call agent, wherein said instruction message includes at least a portion of the called party information;

sending an allocation message from the call agent to the conference server, allocating a conference resource on the conference server;

connecting the conference resource to the call; and connecting a second call from the conference server to the network-based voice messaging service and connecting to the call.

11. The method of claim 10, wherein the step of conferencing a packet-switched telephony client into the call comprises:

determining a network address for the packet-switched telephony client, said determination based at least in part on the called party information;

sending an invitation to the packet-switched telephony client, said invitation addressed to the network address;

providing the network address to the conference server; and connecting a voice path from the conference resource to the packet-switch telephony client based on the network address.

12. The method of claim 1, wherein the packet-switched data network is an IP network.

13. A method of allowing a subscriber associated with a first telephony device to monitor a caller's recording of a call originally directed toward the first telephony device and routed to a network-based voice messaging service, said method comprising:

connecting the caller to the network-based voice messaging service via a media gateway and a conference server, wherein said media gateway interfaces a telephony network and an IP network and wherein said conference server is in communication with the IP network; and connecting a packet telephony client to a communication path shared by the caller and the network-based voice messaging service, wherein said packet telephony client is in communication with the IP network, and wherein the first telephony device is separate from the packet-switched telephony client.

14. The method of claim 13, wherein the packet telephony client comprises a user interface adapted to receive call processing instructions from a subscriber and to send the call processing instructions to the conference server.

15. The method of claim 13, wherein when a subscriber registers an availability with the IP network, a presence database in communication with the conference server is updated with an address for the packet telephony client.

16. The method of claim 13, wherein the packet telephony client comprises a user interface adapted to receive call processing instructions from a subscriber and to send the call processing instructions to an application server, wherein said application server is in communication with the IP network.

17. The method of claim 16, wherein when the subscriber registers an availability with the IP network, a presence database in communication with the application server is updated with an address for the packet telephony client.

18. A system allowing a subscriber to monitor a caller's recording to a network-based voice messaging service, said system comprising:

a first switch serving a subscriber's telephone line;

a second switch serving the network-based voice messaging service;

a first media gateway adapted for voice communication with the first switch;

a second media gateway adapted for voice communication with the second switch;

a conference server adapted for voice communication with the first and second switches;

an application server comprising a presence database, said presence database comprising subscriber registration information; and a packet telephony client adapted for voice communication with the conference server, said packet telephony client associated with the subscriber, wherein when a call from the caller to the subscriber that is directed toward a first telephony device associated with the caller and separate from the packet telephony client, is to be redirected to the network-based voice messaging service, the first switch sets up a voice path to the first media gateway and the first media gateway sends a first message to the application server, and wherein in response to the first message, the application server checks the presence database to identify the subscriber's registration information, and wherein the application server sends a second message to the conference server, said second message comprising registration information associated with the subscriber, and wherein in response to the second message, the conference server sets up a voice path to the first media gateway, the packet telephony client and the second media gateway, and wherein the second media gateway sets up a voice path to the voice messaging server.

19. The system of claim 18, wherein the packet telephony client comprises a user interface adapted to receive call processing instructions from the subscriber and to send the call processing instructions to the application server.

20. The system of claim 18, wherein the packet telephony client comprises a user interface adapted to receive call processing instructions from the subscriber and to send the call processing instructions to the conference server.

21. The system of claim 18, wherein when the subscriber registers an availability with the IP network, the presence database is updated with an address for the packet telephony client.

22. The system of claim 18, wherein the first switch and the second switch comprise the same switch.

23. The system of claim 18, wherein the inbound media gateway and the outbound media gateway comprise the same media gateway.

24. The system of claim 18, wherein when the application server receives a message from the packet telephony client, wherein said message includes an instruction to allow the subscriber to speak to the caller, the application server instructs the conference server to remove the voice path from the conference server to the network-based voice messaging server.

25. The system of claim 24, wherein the packet telephony client is adapted to transmit data packets comprising audible communications only after an instruction to answer the call is received on the packet telephony client.

26. The system of claim 24, wherein the conference server is adapted to transmit data packets comprising audible communications received from the packet telephony client only after the instruction to allow the subscriber to speak to the caller is received from the application server.

27. The system of claim 18, wherein when the application server receives a message from the packet telephony client, wherein said message includes an instruction to allow the subscriber to speak to the caller from a specified telephone, the application server instructs the conference server to remove the voice path from the conference server to the network-based voice messaging serve to set up a voice path from the conference server to the specified telephone.

28. A method of monitoring a caller's recording to a network-based voice messaging service, said method comprising:

receiving a call from the caller to the subscriber on a first switch, wherein the call is originally directed toward a first telephony device associated with the caller and is to be redirected to the network-based voice messaging service;

setting up a voice path from the first switch to a first media gateway;

sending a first message from the first media gateway to an application server;

checking a presence database on the application server to identify registration information associated with the subscriber;

sending a second message from the application server to a conference server, said second message comprising registration information associated with the subscriber;

setting up voice paths from the conference server to the first media gateway, a packet telephony client and a second media gateway, wherein the package telephony client is separate from the first telephony device; and setting up a voice path from the second media gateway to the voice messaging server.

29. The method of claim 28, wherein the packet telephony client comprises a user interface adapted to receive call processing instructions from the subscriber and to send the call processing instructions to the application server.

30. The method of claim 28, wherein the packet telephony client comprises a user interface adapted to receive call processing instructions from the subscriber and to send the call processing instructions to the conference server.

31. The method of claim 28, wherein when the subscriber registers an availability with the IP network, the presence database is updated with an address for the packet telephony client.

32. The method of claim 28, wherein the step of sending a first message from the first media gateway to an application server comprises sending a first data message from the first media gateway to a call agent; and sending a second data message from the call agent to the application server, wherein said second data message includes at least a portion of the first data message.

33. The method of claim 28, wherein the step of sending a second message from the application server to the conference server comprises sending a first data message from the application server to a call agent; and sending a second data message from the call agent to the conference server, wherein said second data message includes at least a portion of the first data message.

34. A method allowing a subscriber to monitor a caller's recording to a voice messaging service, said voice messaging service being based in a telephony network, said method comprising:

routing a caller's call directed toward a first telephony device connected to the telephony network and associated with the subscriber from the telephony network to an inbound media gateway, said inbound media gateway adapted to interface the telephony network with a packet-switched data network;

sending, in response to the call received at inbound media gateway, a first message from the inbound media gateway to a call agent, wherein first message including at least a called party number, and wherein said call agent is adapted to provide call processing instructions in the packet-switched data network;

sending a first instruction from the call agent to the conference server and the inbound media gateway to connect the call to a conference resource on the conference server;

sending a second instruction from the call agent to the conference server to connect a second call to the voice messaging service, said second call being routed through an outbound media gateway;

sending a second message from the call agent to an application server; said second message including at least the called party number;

sending, in response the second message, a third message from the application server to the call agent, said third message including at least a network address associated with a packet-switched telephony client separate from the first telephony device; and sending, in response to the third message, a third instruction from the call agent to the conference server to connect the conference resource to the packet-switched telephony client and a fourth message from the call agent to the packet telephony client, said fourth message including a notification related to the call.

35. The method of claim 34, wherein the inbound media gateway and the outbound media gateway comprise the same media gateway.

36. The method of claim 34, the packet-switched data network comprises an IP network.

37. The method of claim 34, packet-switched data network comprises the Internet.

38. A system allowing a subscriber to monitor a caller's recording to a voice messaging service based in a telephony network, said system comprising:

an inbound media gateway and an outbound media gateway, said media gateways adapted to interface voice calls between the telephony network and a packet-switched data network;

a call agent in the packet-switched data network adapted to provide call processing for voice calls transmitted via the packet-switched data network;

a conference server adapted to provide a conference call between the inbound and outbound media gateways and a packet-switched telephony client associated with the subscriber, said conference server and said packet-switched telephony client in the packet-switched data network, wherein said packet-switched telephony client is separate from a first telephony connected to the telephony network and associated with the subscriber; and an application server in the packet-switched data network, said application server adapted to provide subscriber information to the call agent;

wherein when a caller's call directed toward the first telephony device is to be routed to the network-based voice messaging service by the telephony network, the call is connected to the inbound media gateway, and wherein in response to the call, the inbound media gateway sends a first message to the call agent, said first message including at least a called party number, and wherein the call agent instructs the conference server and the inbound media gateway to connect the call to a conference resource on the conference server, and wherein the call agent further instructs the conference server to connect a second call to the conference resource, said second call being routed through the outbound media gateway to the voice messaging service, and wherein the call agent sends a second message to the application server; said second message including at least the called party number, and wherein in response the second message, the application server sends a third message to the call agent, said third message including the subscriber information, and wherein in response to the third message, the call agent instructs the conference server to connect the conference resource to the packet-switched telephony client and the call agent sends a fourth message to the packet telephony client, said fourth message including a notification related to the call.

39. The system of claim 38, wherein the subscriber information includes at least a network address associated with the packet-switched telephony client.

40. The system of claim 38, wherein the packet-switched telephony client comprises a user interface adapted to receive instructions from the subscriber and to send the instructions to the call agent.

41. The system of claim 38, wherein the packet-switched telephony client comprises a user interface adapted to receive instructions from the subscriber and to send the instructions to the conference server.

42. The system of claim 38, wherein the packet-switched telephony client comprises a user interface adapted to receive instructions from the subscriber and to send the instructions to the application server.

43. The system of claim 38, wherein in response to the second message, the application server checks the presence database for the subscriber's availability on the packet-switched data network.

44. The system of claim 38, wherein an instruction to answer the call is sent from the packet-switched telephony client to the call agent.

45. The system of claim 38, further comprising a presence database in communication with the application server and the packet-switched telephony client, wherein said presence database is adapted to receive registration information from the packet-switched telephony client.

46. The system of claim 38, wherein the packet-switched data network comprises an Internet Protocol network.

47. A system allowing a subscriber to monitor a caller's recording to a voice messaging service in a telephony network, said system comprising:
means for connecting a call path from the caller to the voice messaging server, wherein said call path originates from a call directed towards a first telephony device connected to the telephony network and associated with the subscriber, wherein said call path includes a media gateway, wherein said media gateway interfaces the telephony network to a packet-switched data network;
means for joining a conference server to the call path, wherein said conference server is in the packet-switched data network;
means for joining a telephony client system to the call path through the conference server, wherein said telephony client is in the packet-switched data network and is separate from the first telephony device; and
means for preventing the caller from hearing voice transmission from the subscriber.

48. The system of claim 47, further comprising means for allowing the caller to hear voice transmission from the subscriber if the subscriber sends an instruction to answer the call.

49. The system of claim 48, further comprising means for dropping the voice messaging service.

50. The system of claim 47, further comprising means for joining a specified telephone to the call path through the conference server if the subscriber sends an instruction to answer the call, wherein said instruction identifies the specified telephone.

51. The system of claim 50, wherein the instruction further identifies a telephone number for the specified telephone.

52. A method of allowing a subscriber to monitor a caller's recording to a voice messaging server, said voice messaging server being in a circuit-switched telephony network, said method comprising:
detecting a call directed towards a first telephony device connected to the circuit switched telephony network and associated with the subscriber at a switch serving the subscriber;
routing the call from the switch to a media gateway, said media gateway adapted to provide an interface between the circuit-switched telephony network and a packet-switched data network;
checking a database for an availability of the subscriber on the packet-switched data network; and
establishing a conference call through a conference server, said conference server being in the packet-switched data network and said conference call connecting the caller's call from the media gateway to the network-based voice messaging service and connecting the caller's call to a packet-switched telephony client, if the subscriber is available on the packet-switched data network, wherein the packet-switched telephony client is separate from the first telephony device.

53. The method of claim 52, further comprising connecting the caller's call from the media gateway to the network-based voice messaging service, if the subscriber is not available on the packet-switched data network.

54. The method of claim 52, further comprising receiving a registration message from the packet-switched telephony client, wherein said registration message includes the availability for the subscriber.

55. The method of claim 52, further comprising extending the conference call to include the first telephony device according an instruction received from the packet-switched telephony client.

56. The method of claim 55, wherein the first telephony device is a telephone.

57. The method of claim 56, further comprising removing the network-based voice messaging service from the conference call according to the instruction received from the packet-switched telephony client.

58. The method of claim 52, wherein when the conference call is connected between the caller's call, the voice messaging service and the packet telephony client, no voice communication is passed from the packet telephony client to the voice messaging service or to the caller's call.

59. The method of claim 52, wherein when the conference call is connected between the caller's call, the voice messaging service and the packet telephony client, voice communication is passed from the packet telephony client to the voice messaging service or to the caller's call.

60. The method of claim 52, wherein when the conference call is connected between the caller's call, the voice messaging service and the packet telephony client, no voice communication is passed from the packet telephony client to the voice messaging service or to the caller's call only if a predetermined instruction is input to the packet telephony client.

61. The method of claim 52, further comprising removing the network-based voice messaging service from the conference call according to the instruction received from the packet-switched telephony client.

62. The method of claim 52, wherein the packet-switched data network is an IP network.

63. The method of claim 52, wherein the circuit-switched telephony network is an public switched telephone network.

* * * * *